US009087054B2

(12) United States Patent
Thijssen et al.

(10) Patent No.: US 9,087,054 B2
(45) Date of Patent: Jul. 21, 2015

(54) METHOD AND APPARATUS FOR MANAGING DOCUMENT DATA FOR EVENTUAL PRESENTATION TO A USER

(75) Inventors: Abraham Thijssen, Vierlingsbeek (NL); Sander H. Lokerse, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 1799 days.

(21) Appl. No.: 10/654,487

(22) Filed: Sep. 4, 2003

(65) Prior Publication Data
US 2004/0054972 A1    Mar. 18, 2004

(30) Foreign Application Priority Data

Sep. 4, 2002 (EP) ..................... 02078764

(51) Int. Cl.
*G06F 17/30* (2006.01)
(52) U.S. Cl.
CPC ................. *G06F 17/30011* (2013.01)
(58) Field of Classification Search
CPC .......... G06F 17/30011; G06F 17/30256; G06F 17/30569; G06F 17/30265; G06F 17/3092; G06F 17/30076; G06F 17/30179; G06F 17/30153; G06F 17/30867; G06F 17/30575; G06F 17/30174; G06F 17/30091; G06F 17/30194; G06F 17/30309; G06F 17/30082; G06F 17/30215; G06F 17/30073; G06F 17/30209
USPC ........... 707/2, 5, 100, 101, 1, 10, 200, 3, 602, 707/661, 694, 705; 709/236, 246; 715/526
See application file for complete search history.

(56) References Cited

U.S. PATENT DOCUMENTS

| 5,740,405 | A |   | 4/1998  | DeGraaf |
| 5,956,029 | A | * | 9/1999  | Okada et al. .................. 715/746 |
| 5,978,363 | A | * | 11/1999 | Dimitrijevic et al. ......... 370/319 |
| 6,094,684 | A | * | 7/2000  | Pallmann ...................... 709/227 |
| 6,119,130 | A |   | 9/2000  | Nguyen et al. |

(Continued)

FOREIGN PATENT DOCUMENTS

| EP | 1 207 463 A2 | 5/2002 |
| JP | 06-052283 A  | 2/1994 |

(Continued)

*Primary Examiner* — Christyann Pulliam
*Assistant Examiner* — Rezwanul Mahmood
(74) *Attorney, Agent, or Firm* — Birch, Stewart, Kolasch & Birch, LLP (57) ABSTRACT

A management method and management system for physically managing data that represents an image for eventual presentation to a user, based on the data, wherein the data is first acquired from an appropriate image source in a source representation, next, the data in source representation is selectively converted to data in destination representation, using the selective storing of managed data as an intermediate item. First quantitative physical storage constraints associated with storing are assessed; second, quantitative physical converting constraints associated with converting the stored managed information from the source version information to the presentation version information is assessed, the converting being executed before the storing, and/or after the storing, on a dynamic trade-off basis between the first and second assessing; third, quantitative physical transfer constraints associated with transferring the managed information over a transfer facility are assessed, with the execution having a further dynamic trade-off basis through using the third assessment.

19 Claims, 6 Drawing Sheets

(56) References Cited

U.S. PATENT DOCUMENTS

| | | |
|---|---|---|
| 6,185,625 B1 | 2/2001 | Tso et al. |
| 6,336,124 B1* | 1/2002 | Alam et al. .................. 715/205 |
| 6,362,836 B1 | 3/2002 | Shaw et al. |
| 6,459,825 B1* | 10/2002 | Lippincott .................... 382/312 |
| 6,651,120 B2* | 11/2003 | Chiba et al. .................... 710/65 |
| 6,732,915 B1* | 5/2004 | Nelson et al. ................ 235/375 |
| 6,965,569 B1* | 11/2005 | Carolan et al. ............... 370/238 |
| 7,240,063 B2* | 7/2007 | Aoyama ........................ 707/100 |
| 7,752,214 B2* | 7/2010 | Pizzorni et al. ............... 707/756 |
| 2001/0013070 A1* | 8/2001 | Sasaki ........................... 709/246 |
| 2002/0057441 A1 | 5/2002 | Chen et al. |
| 2002/0161659 A1* | 10/2002 | Veilleux et al. ................ 705/26 |
| 2002/0180755 A1* | 12/2002 | Krueger ........................ 345/601 |
| 2003/0041095 A1* | 2/2003 | Konda et al. ................. 709/201 |
| 2003/0046430 A1* | 3/2003 | Iwade et al. .................. 709/246 |
| 2003/0083966 A1* | 5/2003 | Treibach-Heck et al. ...... 705/32 |
| 2003/0182306 A1* | 9/2003 | Maeda ...................... 707/103 R |
| 2003/0210821 A1* | 11/2003 | Yogeshwar et al. .......... 382/232 |
| 2004/0047510 A1* | 3/2004 | Kawabata ..................... 382/232 |
| 2005/0080755 A1* | 4/2005 | Aoyama ........................... 707/1 |

FOREIGN PATENT DOCUMENTS

| | | | | |
|---|---|---|---|---|
| JP | 8-317384 A | | 11/1996 | |
| JP | 11-219423 A | | 8/1999 | |
| JP | 11219423 A | * | 8/1999 | ............... G06T 1/00 |
| JP | 2000-228687 A | | 8/2000 | |
| JP | 2001-197230 A | | 7/2001 | |
| JP | 2001-326930 A | | 11/2001 | |
| JP | 2002-44463 A | | 2/2002 | |
| JP | 2002-057887 A | | 2/2002 | |
| JP | 2002-099430 A | | 4/2002 | |

* cited by examiner

GLOBAL SYSTEM

METHOD AND APPARATUS FOR MANAGING DOCUMENT DATA FOR EVENTUAL PRESENTATION TO A USER

This non-provisional application claims priority under 35 U.S.C. §119(a) on Patent Application No. 02078764.4 filed in Europe on Sep. 5, 2002, which is herein incorporated by reference.

BACKGROUND OF THE INVENTION

Field of the Invention

The present invention relates to a method for physically managing data that represents a document, for eventual presentation of the document to a user. A well-known system for physically managing document data has the following stages:

first, acquiring the data that comprises the document itself, the document format, etc., from a source device, such as a scanner, a webcam, or a PC application, next, archiving the data on a server facility, and finally, coupling the data to a destination device, such as a printer, the web, or a PC application.

Destination devices present widely varying requirements for presenting a document or image thereon, the so-called destination profile, and a particular environment could have various different destination devices coexist. Likewise, a particular source has a source profile, and a distributed system can have various source devices which coexist with non-uniform properties or profiles. Disregarding this variety would imply the sending of data to destination(s) in a standard format that could be inconsistent with the destination's requirements for optimum operation, and thus necessitate local conversion. Converting to the destination's format only at the destination device itself, such as a printer, could bring about unwanted delays before the representation would be ready. Furthermore, the load on a transport or transfer facility to the destination device could be lowered by converting the document data to the standards of the destination device before such transport or transfer.

On the other hand, the archiving of the documents could already be in a form that accommodates the requirements of the destination device. Not knowing the actual destination device in question could, in the presence of multiple destinations lead to unjustified storage requirements. Finally, the proper acquiring of the data by the source device could benefit from already knowing the actual destination device, so that appropriate values for various parameters could be set, as a preparation for allowing subsequent presentation to be activated through a single-button command. Again, the above uncertainty regarding the actual destination would defeat this approach. In extensive set-ups or organizations, the above problem could involve many variables that should all be set for attaining an optimum solution.

It has been recognized that an optimization could provide a method that incurs lower costs through a trade-off procedure that intends to solve the above problem.

SUMMARY TO THE INVENTION

It is an object of the present invention to improve the physical management procedure of data that represents a document, with regard to quantitative physical constraints associated to the various stages of such management, such as would be associated with processing time, storage facility availability, capacity of a transfer facility, deadlines that may be set for certain results, quality-of-service, and the like, while at the same time maintaining system consistency, and at least to an appreciable degree, meeting the above single control button requirement.

The various quantitative physical constraints may be expressed in a single quantity or weight factor for rendering them comparable in making the trade-off, such as a particular cost metric, hereinafter referred to as cost, for short. Such comparisons may, but need not be made in terms of money. Another mapping could be the percentage of use of a particular facility. The present invention optimizes the eventual choice on the basis of the above single quantity. The various trade-off's are dynamic, in that they may be determined by the interactions between multiple demands on the various resources, the availability of those various resources themselves, and other factors. The decision on the trade-off's may be made by consulting a rule base for deciding on the specific format(s) or representations. Such rule base may include various particular parameters, such as a subscription or another type of contract for a particular customer, restrictions associated with the time-of-day, a quotum assigned to a particular customer or account, the total financial costs, and various other parameters.

The present invention also relates to an apparatus or system arranged for implementing the present method, a system or apparatus for physically managing data according to the present method and a computer program implementing the present method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

FURTHER ASPECTS OF THE IMAGE DATA REPRESENTATION SERVER

When generating data for storage in a server archive, an operator advantageously should be relieved from the requirement to set all parameters that could be applicable to a subsequent representation. One particularly advantageous policy therefor could be to operate the source device on its highest possible generating quality level, such as at maximum resolution for a scanner device. Alternatively, this highest necessary quality could be codetermined by the eventual requirements of a user; and this could, in fact, lead to lower actual requirements.

Seen from the destination side, the user should be able to select the particular data for retrieval, by sending a communication request that specifies an intended destination profile. If such a profile is not immediately available at the server, later conversion of actually stored image data may yet produce what the destination wants. The conversion will be effected by traversing a path of one or more conversion mechanisms available either locally or on the network. Next, the result of the conversion will be stored in the archive as a representation of the original data. By so doing, the result of the conversion will not have to be generated again. The conversion may be effected either on the basis of the original data, or on the basis of an intermediate conversion result. The latter procedure will generally necessitate less conversion effort. The converter will seek the shortest or fastest conversion path to the desired representation. At the server, various procedures will insure that superfluous representations will be deleted, or that certain representations will be generated immediately on receipt of the original data. Various advantages of the present invention are the following:

The generation of the representations for a requesting destination device will guarantee system consistency. A particular example is to execute a conversion with an optimum procedure for printing scanned images on a variety of machines.

Inasmuch as a user will not need to worry about the quality of stored images, or the particular representation that will be retrieved from the database, a single-button activation of the representation will be made possible. This applies both to the acquiring side of the system and also to the destination side.

By avoiding the sending of superfluous data to the destination, the transport load of the network will be significantly lower. The original representation will still be available so that no loss of data will occur.

By generating a particular representation only once, the processing time for subsequent requests for the same data will generally be maintained at a minimum. This will also apply to the case where the same image will be converted to a plurality of representations that are usable in parallel, such as a bitmap representation in parallel to an ASCII coded text representation obtained by optical character recognition.

DETAILED DESCRIPTION OF THE INVENTION

Figure 1:
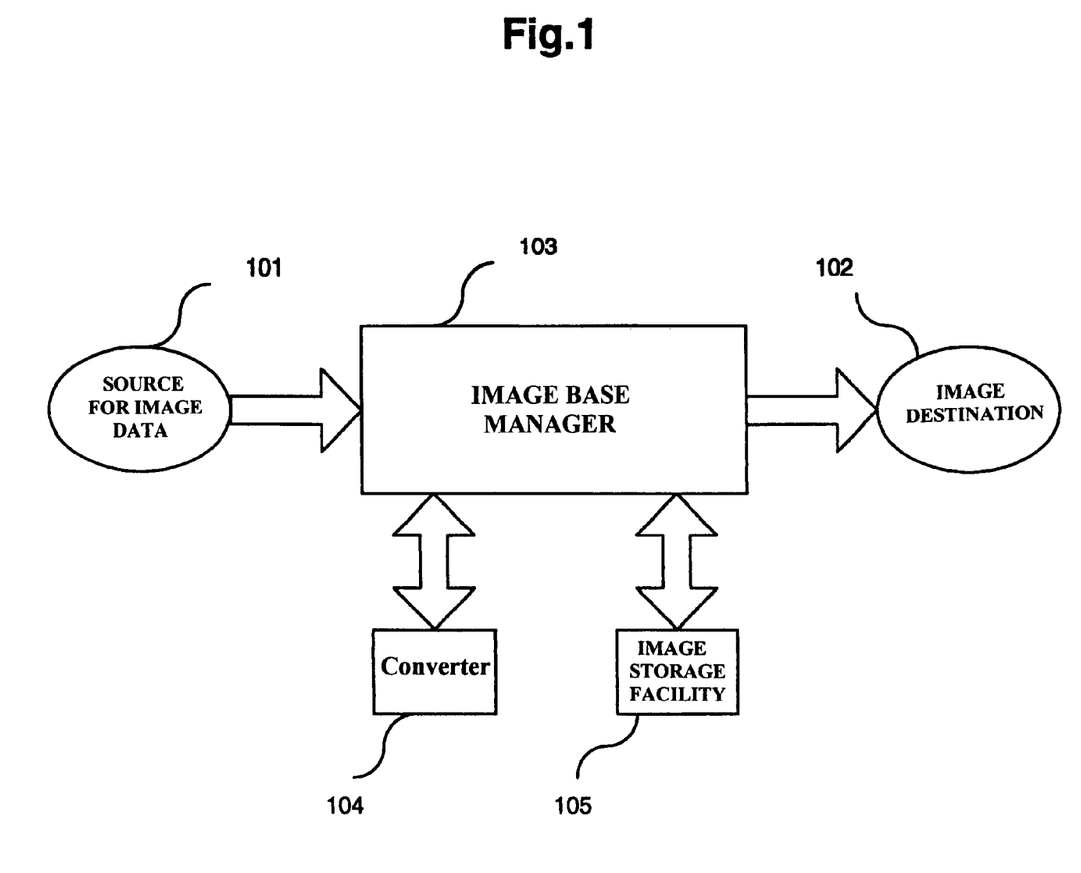
FIG. 1 is a diagram of a global scan-server architecture for use with the present invention.

FIG. 1 illustrates a diagram of a global architecture for use with the present invention. Module 101 represents a source for image data that will generally be formed from pixels of a single image. The representation may be various, first regarding the constitution of a single pixel that may be colored or black/white and may have an appropriate number of bits. Second, the image may have a variety of configurations in view of the arrangement of the pixels, such as the image resolution, and the size and shape of the image. Furthermore, the pixels could have certain attributes such as temporally changing through blinking, and the like. Finally, the nature of the source device may influence the organization of the presentation, such as a line scanner versus a PC based presentation. For the present invention, the content of the image, in the sense of "meaning" is left out of consideration.

Module 102 represents the destination, where a user will want the image for further application. Here, the representation may be again various in nature. Next to the various representations of the complete image that are appropriate to particular destination devices, a specific representation will be the so-called thumbnail version that is used for an extremely compact representation, such as for allowing on-the-fly viewing or printing of a plurality of images or pages on a single frame or sheet. This would, for example, allow for a very quick view or mental note of the overall content of a multi-page document. Module 103 represents the ImageBase manager which controls the transport of images from source to destination, and also the interaction with modules 104 and 105. Module 105 represents a storage facility for storing images in the representations that are considered advantageous for attaining a good operation of the overall system and allows the destination to get the right representation of the images within an acceptable delay. Module 104 represents various converters that convert the source image in one or more steps to a destination image.

Figure 2:
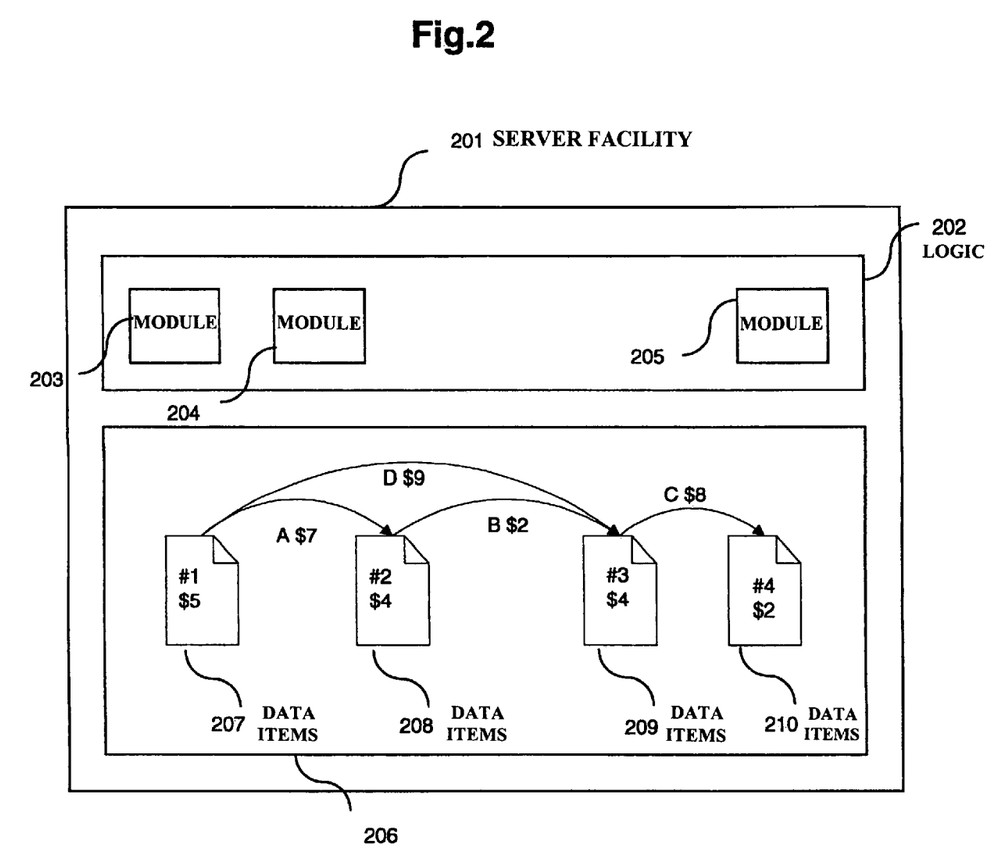
FIG. 2 is a diagram of a server facility for use with the present invention.

FIG. 2 illustrates a diagram of a server facility for use with the present invention. The overall server facility 201 has an upper part 202 that contains the logic, having various modules of which modules 203, 204 and 205 have been symbolically shown. Module 203 may contain a rule base, cf. hereinafter for further disclosure. The lower part 206 contains the database having various stored data items of which data items 207, 208, 209 and 210 have been shown symbolically, and which represent as many representations #1, #2, #3, #4 of a single image that has been symbolized as a page. In addition, the costs of storage have been indicated as being 5, 4, 4, and 2, respectively. In an elementary organization, these costs may indicate an amount of storage space required for storing the version in question. In the first place, such storage costs are relative to each other, so that a cost of "4" is two times as high as a cost of "2". Furthermore, inasmuch as later on other cost categories will also be used, such as for conversion or transmission, the rule base used for the system may undertake to assign an absolute measure to the cost. This could be done in various manners. A first one is to relate the storage space to an overall available storage capacity. For example, if total storage is 100%, and a particular item requires 1% thereof, the assigned cost could be an absolute value of 1. Still another approach would be to assign such absolute costs through a trial and error procedure, or through simulation. Regarding the present invention, the cost of storage does not relate to the duration of the actual storage in question.

Furthermore, between various pairs of representations, respective arrows symbolize a conversion therebetween. Each arrow is based on a recipe A, B, C, D, and each recipe has an associated amount of quantitative physical constraints or cost, to wit 7, 2, 8, 9, respectively. As an example, the converting between representation #2 and representation #3 needs recipe B, and brings about a cost of 2. In an elementary organization, these costs may indicate an amount of processing time required for executing the recipe in question. In practice, the cost of a particular recipe, such as black/white clipping, may be non-uniform, but may depend on the size of an image, as measured in its number of pixels. For the present embodiment, this effect will again be disregarded. Here again, the costs as indicated are, in a first instance, relative. However, for comparison with other cost categories, the system may undertake to assign absolute values to the various cost values. In this respect, the processing time necessary for a particular conversion may be compared with some overall processing interval, such as the time necessary to read or write the overall available memory space, or another useful time interval. Still another procedure would be to set this overall interval at some useful value, such as in a trial and error procedure.

Furthermore, a third category of costs for finding an optimum trade-off, is transmission costs over the network facility. Again, such costs may be expressed in a relative manner, as the various time intervals necessary for effecting the transport in question. In addition, these values have their relative size as compared with each other. However, for comparison with other cost categories, the system may undertake to assign absolute values to the various cost values. In this respect, the transfer time necessary for a particular transfer may be compared with some overall operational interval, such as the time necessary to read or write the overall available memory space, or another useful interval. Still another procedure would be to set this overall interval at some useful value, such as in a trial and error procedure. If now all three cost categories have been assigned absolute values, their use can be compared with each other for eventually an optimum solution.

A still further category of costs is caused by delay. This may be caused both by the conversion process and also on the transfer process. As such, this could be included in the other cost categories. However, a particular aspect is that an overly long delay could be fully unacceptable. In such a case, virtual costs may be imposed that run non-linearly with the actual length of the delay, but will rise steeply above a certain threshold. The virtual costs may be superimposed on or added to the other costs. Another cost category would be quality-of-service.

Now, representation #1 is assumed to be a scanned original generated by a producer. The characteristics of the image are described by a source profile that depends on the generator, which produced the image. A consumer may now ask for one or more images, such as a sheet or an article. By communicating the destination profile, the logic will search for the representation in the database. If not available immediately, the logic will generate the representation, that is optimized for the consumer in question. The amount of costs incurred in this way may depend on various aspects, such as resources available or licenses to be paid. One objective should be the optimum use of the various resources available. After generating the representation, it will, in principle, be stored in the database.

Now, in particular, block 203 is arranged for executing an Automatic Representation Management ARM that executes a strategy for filling the database based on a set of rules. Two types of widely applicable rules will be considered. First, there are persistency rules such as:

Always store a representation in the database that has been generated recently. This procedure operates faster when representations will be asked for more than once. However, the database will grow quite fast.

Never store a representation in the database that has been generated recently, but keep the old one. This procedure operates slower when representations will be asked for more than once. However, the database will grow much more slowly. Of course, intermediate approaches between the above two could be used, such as those being dependent on history.

Furthermore, other rules will be based on garbage collection, such as:

Remove all derived representations that have not been asked for during a certain time interval, and keep only the original version.

Remove all derived representations that have not been asked for at least X times during a certain time and keep only the original version.

Remove all derived representations from the database and keep only the original version as governed by the cost comparison expression C(storage)≥C(conversion from old representation to new representation), wherein C indicates the costs associated with the two respective procedures.

Figure 3:
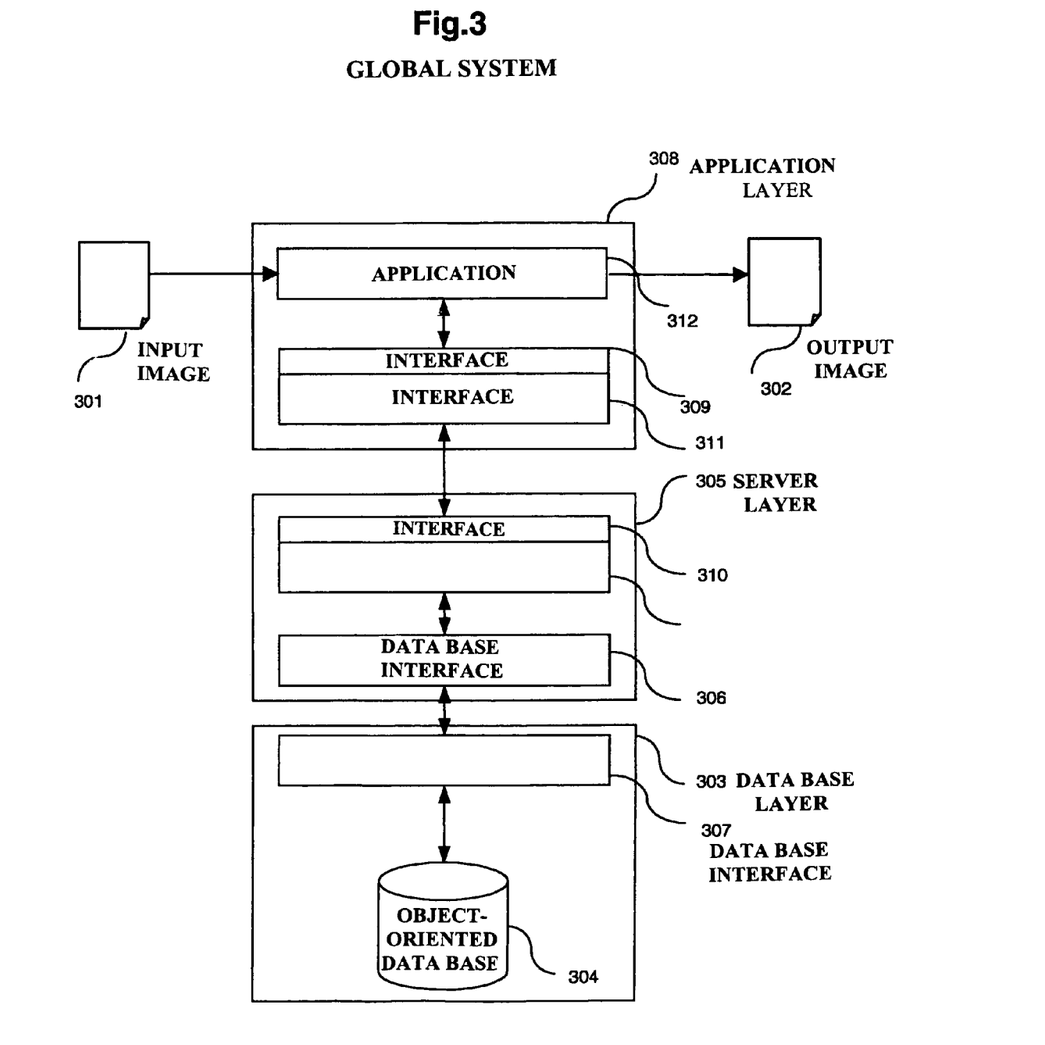
FIG. 3 is a global system architecture according to the present invention.

FIG. 3 illustrates a global system architecture according to the present invention, which as shown, is conceptually positioned intermediate between an input image 301 and an output image 302. The architecture has three layers, to wit, a data base layer 303 that manages the data scheme set up for storing the images and their different representations in an object-oriented database 304. Next, server layer 305 stores, retrieves, modifies, and deletes data through a Database Interface 306, 307 provided by the database layer 303. Finally, client layer or application layer 308 comprises an application 312, such as scanning, printing, and viewing. An Interface 309, 310 has been defined for communicating between the application and the server layer, while defining the basic functionality for the application layer. Furthermore, a remote Interface 311 allows a remote connection to the server layer.

The interface between application layer and server layer defines the server's connection to the outside world, and makes clear what exactly should be stored in the database. An exemplary set of calls may contain: AddImage, GetImage, CreateRepresentation, GetProfileList, GetProfile, AddProfile, DeleteProfile.

An exemplary interface between the image base manager and the converter engine may contain the following items: CalculateCost, DoProcess.

Further to the above, an interface allows several different clients to coexistently invoke an interface dispatched by a server application. Multiple access by diverse clients needs a locking mechanism to prevent the database from becoming inconsistent. By itself, locking mechanisms on various different levels of granularity in time and space have been developed in the art, and for brevity, no further discussion has been given thereof. At the end of each particular call, the database is left in a defined state for this purpose.

Figure 4:
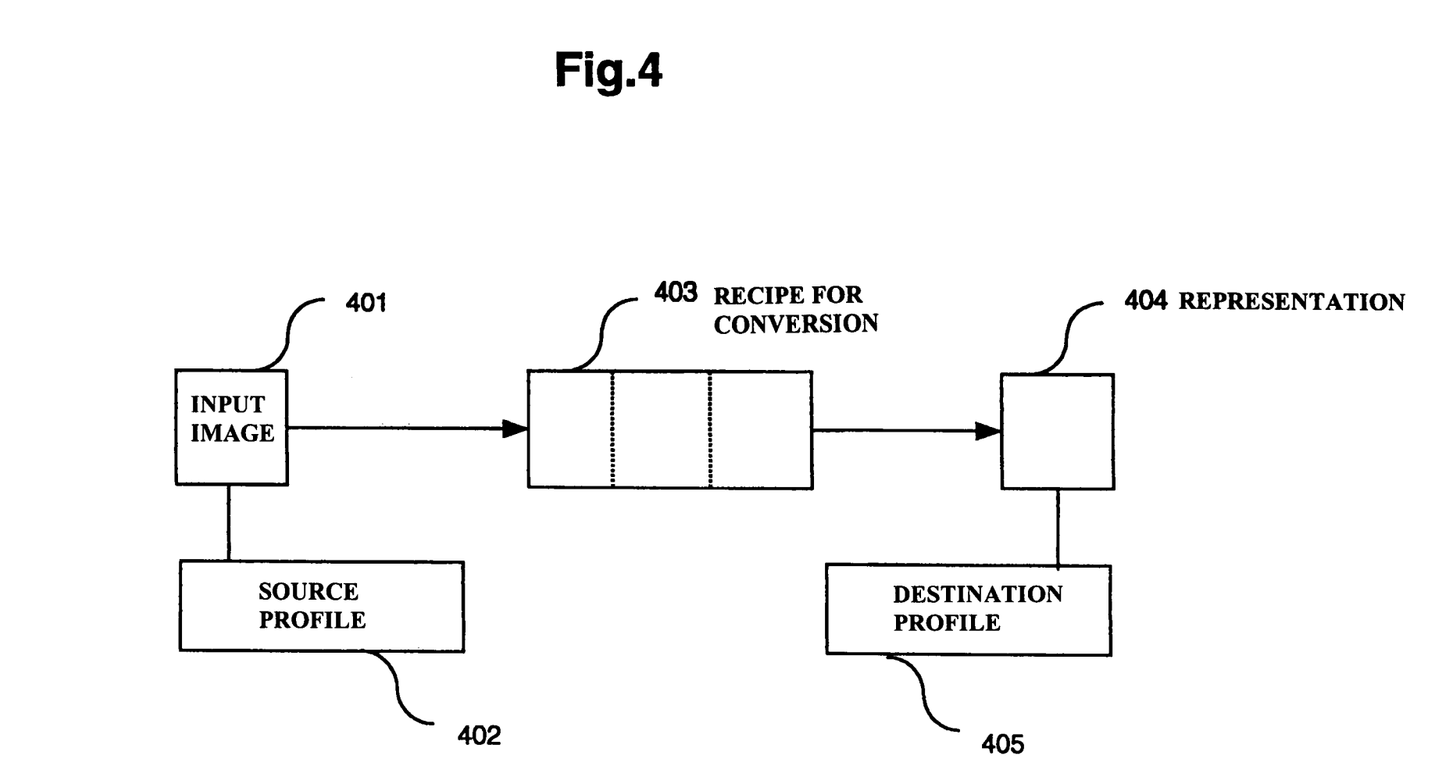
FIG. 4 is an example of a recipe for use with the present invention.

FIG. 4 illustrates a recipe example for use with the present invention. By itself, a wide variety of image conversions would be obvious from the present disclosure to persons skilled in the art, and accordingly, only a single sequence of recipes will be discussed hereinafter. In FIG. 4, an initial representation of the image 401 is input at left. This may be an original representation, but may in fact be as well an intermediate representation that has already been converted in earlier steps not shown. As indicated, this representation has a source profile 402 indicating it has a true grey scale and eight bits per pixel. The recipe for conversion 403 has three successive steps that in fact could each represent separate recipes as well. First, the image is made smooth. In this conventional procedure, pixeled edges in the image are made smooth so that acute angles are made smoothed to a certain extent, discontinuous, e.g. dropout pixels, are adapted to their neighbor's values to a certain extent, and the like. Second, the image is sharpened. This procedure will enhance edges, so that the result of the processing will more clearly exhibit distinguished features of the elements of the image. Third, the result is subjected to a halftone procedure to give the eventual representation 404. This representation has the destination profile 405 that is black/white with true representation at 1 bit per pixel. None of the various conversions discussed herein addresses the meaning of the image, although the scope of the conversions may be very broad. Next to converting color to black and white, the conversion may give false color, modify the grey scale, enhance certain image elements, amend the dynamic color range, invert black and white, amend additive to subtractive colors and vice versa, change RYB to YUV color schemes, introduce blinking, and many others. However, the present invention does not use an overall assessment of an image's content or meaning, inasmuch as such would require still other procedures to be introduced.

Figure 5:
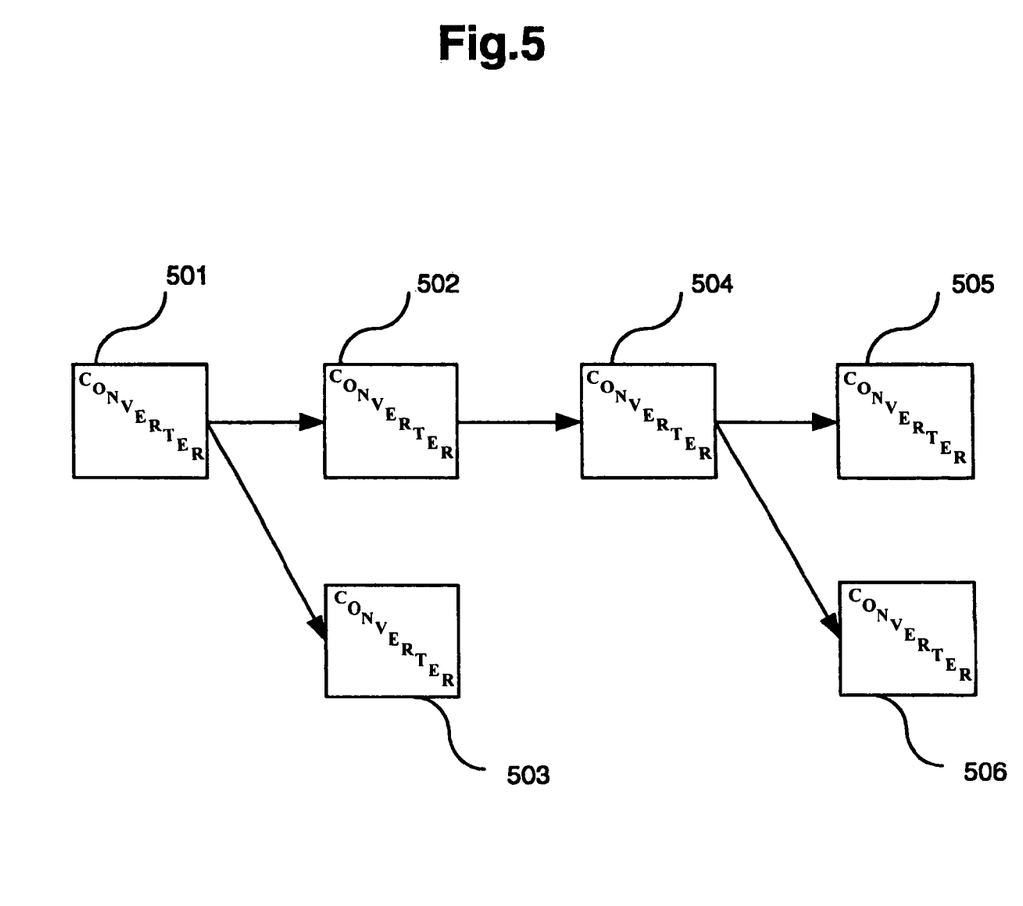
FIG. 5 is an example diagram showing various linked converters.

FIG. 5 illustrates an example diagram showing various linked converters 501 through 506. As shown, the result of converter 501 may be used by converter 502 as well as by converter 503. The result of converter 502 is exclusively used by converter 504. Furthermore, the result of converter 504 may be used by converter 505 as well as by converter 506. The results of converters 503, 505 and 506 could be useful for an applicable destination. In principle, the result from two separate converters could join to give identical results. One possible occurrence thereof could be identical converters being present at respective different locations in the network, possibly combined with distributed storage facilities before, between, or after the conversion.

Figure 6:
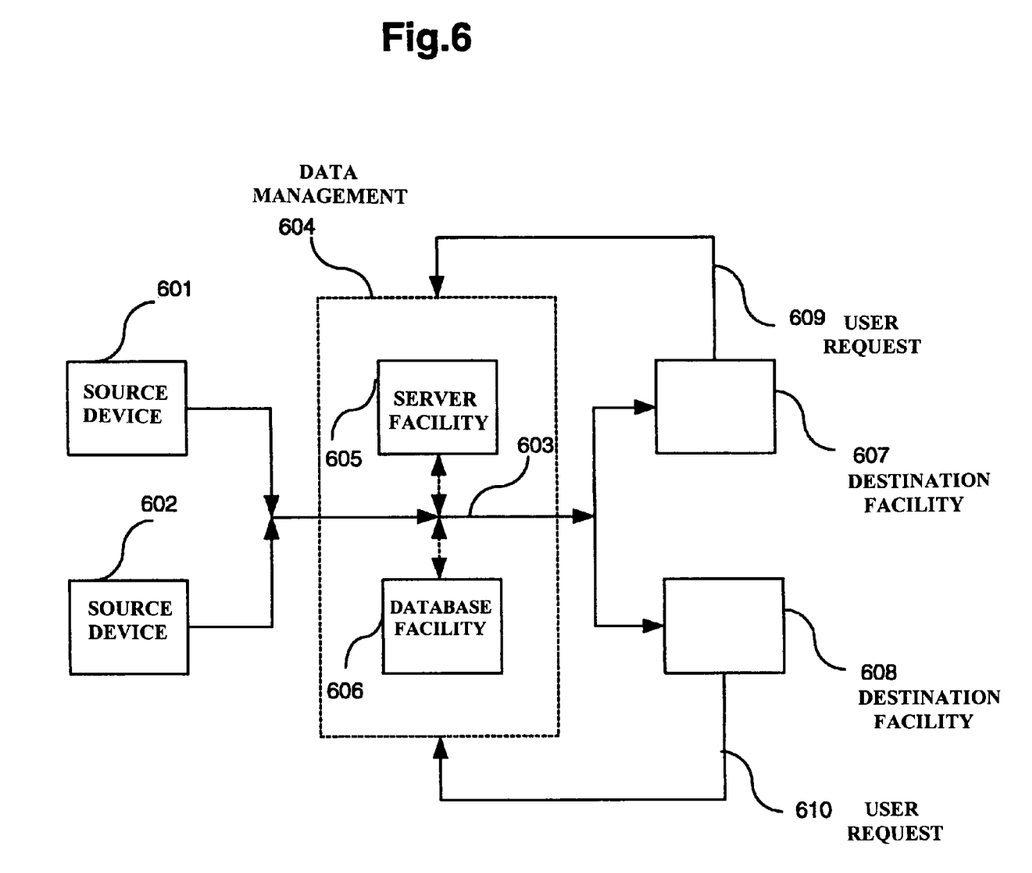
FIG. 6 is a block diagram of an overall system applying the present invention.

FIG. 6 illustrates a block diagram of an overall system applying the present invention. At left, source devices 601, 602 may generate images in their respective idiosyncratic profiles for transfer via transfer facility 603. In the middle, data management is executed through facility 604 that comprises server facility 605 and data base facility 606, which will bidirectionally interface with transfer facility 603. At right, destination facilities 607 and 608 will receive images according to their respective idiosyncratic destination profiles from the transfer facility 603. Furthermore, user requests will be sent on lines 609, 610 to the central data management facility 604. The transfer facility 603 has not been detailed, but persons skilled in the art will know how to map such on standard network concepts, or more in general, on a transfer organization that distinguishes in a correct manner between data, control signals, and service signals. Furthermore, requests for source facilities 601, 602, could be entered as well into transfer facility 603, or be communicated on separate connections not shown for brevity. In addition, sources and destinations have been indicated in a blockwise manner only for brevity.

In a manner similar to the method disclosed in the previous description, a storage management system is presented for managing storage of different versions of a particular document. For this purpose a version is defined by a specific version of an application, with which the document is generated or with which the document can be processed or accessed. It is observed that in the course of years application programs, like word processing programs, image editing programs, data base programs, video and audio recording and editing programs and the like are renewed regularly and new versions of these programs are brought to the market. Most of the time functionality is added to such a new version and necessarily the specific data format in which the output of these programs is coded is changed. The storage management system at hand now keeps track of the version data of documents stored in the database and keeps track of the version data of still available application programs. At the moment a new version of an application becomes available and is registered in the storage management system, the system decides, based on constraints, if it is appropriate to convert documents of a previous version to the most recent version. This leads to a storage management system for managing storage of different data format versions of a document, where a document is associated with a particular application program, and where the document is expressed in a particular data format belonging to the particular application program. The storage management includes converting a document from a first data format to a second data format; a first register for registering data format data of documents stored in a database; a second register for registering data format data of valid application programs; a third register for registering available conversions from one data format to another data format; user interface means for updating the register of valid application programs by an operator; and control means for automatically invoking a conversion from a first data format to a second data format, the second data format being associated with a valid application program for all documents for which no valid application program is available in the second register, after updating of the second register.

When the operator now indicates to the system that a certain application program no longer will be used and thus is indicated as being invalid, the system automatically will make available the document in a new format, for which a valid application program is available. In this way, digital durability is obtained.

The invention being thud described, it will be obvious that the same may be varied in many ways. Such variations are not to be regarded as a departure from the spirit and the scope of the invention, and all such modifications as would be obvious to one skilled in the art are intended to be included within the scope of the following claims.

What is claimed is:

1. A managing method for managing data that represents a document for eventual presentation to a user, based on said data, which comprises the steps of:
    acquiring the data from an appropriate document source in a source representation,
    selectively converting the data in source representation to data in destination representation, while selectively storing in a database managed data in an intermediate representation,
    first, assessing quantitative storage constraints associated with storing the managed data,
    second, assessing quantitative physical converting constraints associated with converting the stored managed data from the source representation to the presentation representation,
    third, assessing the quantitative physical transfer constraints associated with transferring the managed data over a transfer facility of an applicable distributed system, and
    executing the converting before said storing, and/or after said storing, respectively, on a dynamic trade-off basis between said first assessment and said second assessment, while further considering one or more applicable source profiles and one or more applicable destination profiles, and in said execution providing a further dynamic trade-off basis through the application of the third assessment,
    wherein the selectively converting step selectively converts the data in the source representation to the data in the destination representation based on an idiosyncratic destination profile of a destination apparatus represented by the destination representation automatically and without receiving a specification of a conversion form of the data in the destination representation from a user, and
    wherein the quantitative physical storage constraints, the quantitative physical converting constraints, and the quantitative physical transfer constraints are made comparable through assigning to the respective constraints appropriate absolute values of a cost metric.

2. The method of claim 1, wherein the document essentially relates to an image.

3. The method as claimed in claim 1, wherein the quantitative physical storage constraints are based on storage space availability, the quantitative physical converting constraints are based on destination delay allowability, and the quantitative physical transfer constraints are based on transfer facility availability and/or transfer duration.

4. The method of claim 3, wherein the quantitative physical converting constraints and/or the quantitative physical transfer constraints are based on a quality-of-service metric.

5. The method of claim 1, wherein the managing method is executed by consulting a rule base.

6. The method of claim 1, wherein the converting is effected through a sequence of sub-conversions to produce one or more intermediate representations which are stored in lieu of storing an eventual destination representation.

7. The method of claim 1, wherein available storage space is assigned to the storing of various documents in various representations for future user requests for image presentations.

8. The method of claim 7, wherein coexistent storage of a particular document in a plurality of different representations is provided.

9. The method of claim 1, wherein document data is maintained in the database, governed by one or more persistency rules.

10. The method of claim 1, wherein document data in the database is governed by one or more garbage collection rules.

11. The method of claim 1, wherein further image presentation is allowed in a thumbnail version.

12. The method of claim 1, wherein a source device is operated at its highest possible image presenting quality level.

13. The method of claim 1, wherein a source device is operated at an image processing level quality that is at least co-determined by the eventual requirements associated with an intended user device and/or application.

14. The method of claim 1, wherein an application to invoke a remote server facility is provided through a remote interface.

15. The method of claim 1, which comprises, providing for operation with multiple users, a data consistency maintained through an appropriate locking mechanism.

16. A management system for managing information that represents a document for eventual presentation to a user, based on said information and provided by a destination profile, which comprises:
acquiring means for acquiring said information from an appropriate document source in a source representation,
converting means for selectively converting the data in source representation to data in destination representation,
storing means for selectively storing, in a database, managed data as an intermediate item of said management system,
assessing means for assessing first quantitative storage constraints associated with storing said managed information, second quantitative converting constraints associated with converting said stored data in source representation to said data in destination representation and third quantitative physical transferring constraints associated with transferring said managed data over a transfer facility, and
execution means for executing said converting before said storing, and/or after said storing and/or after said transferring, on a dynamic trade-off basis, produced by said assessing means,
wherein the converting means selectively converts the data in the source representation to the data in the destination representation based on an idiosyncratic destination profile of a destination apparatus represented by the destination representation automatically and without receiving a specification of a conversion form of the data in the destination representation from a user, and
wherein the quantitative physical storage constraints, the quantitative physical converting constraints, and the quantitative physical transfer constraints are made comparable through assigning to the respective constraints appropriate absolute values of a cost metric.

17. The system of claim 16 comprising one or more source facilities, and one or more destination facilities linked with each other through a transfer facility for the physical managing of information contained in a data base facility and a server facility.

18. A computer program comprising a non-transitory computer-readable storage medium containing a set of instructions which, when used in a general-purpose computer, performs a managing method comprising the steps of:
acquiring the data from an appropriate document source in a source representation,
selectively converting the data in source representation to data in destination representation, while selectively storing in a database managed data in an intermediate representation,
first, assessing quantitative storage constraints associated with storing the managed data,
second, assessing quantitative physical converting constraints associated with converting the stored managed data from the source representation to the presentation representation,
third, assessing the quantitative physical transfer constraints associated with transferring the managed data over a transfer facility of an applicable distributed system, and
executing the converting before said storing, and/or after said storing, respectively, on a dynamic trade-off basis between said first assessment and said second assessment, while further considering one or more applicable source profiles and one or more applicable destination profiles, and in said execution providing a further dynamic trade-off basis through the application of the third assessment,
wherein the selectively converting step selectively converts the data in the source representation to the data in the destination representation based on an idiosyncratic destination profile of a destination apparatus represented by the destination representation automatically and without receiving a specification of a conversion form of the data in the destination representation from a user, and
wherein the quantitative physical storage constraints, the quantitative physical converting constraints, and the quantitative physical transfer constraints are made comparable through assigning to the respective constraints appropriate absolute values of a cost metric.

19. A managing method for managing data that represents a document for eventual presentation to a user, based on said data, which comprises the steps of:
acquiring the data from an appropriate document source in a source representation,
selectively converting the data in source representation to data in destination representation, while selectively storing in a database managed data in an intermediate representation,
first, assessing quantitative storage constraints associated with storing the managed data,
second, assessing quantitative physical converting constraints associated with converting the stored managed data from the source representation to the presentation representation, third, assessing the quantitative physical transfer constraints associated with transferring the managed data over a transfer facility of an applicable distributed system, and executing the converting before said storing, and/or after said storing, respectively, on a dynamic trade-off basis between said first assessment and said second assessment, while further considering one or more applicable source profiles and one or more applicable destination profiles, using an procedure for printing scanned images on a variety of output devices, and using a single button activation of a representation retrieved from the database, and in said execution providing a further dynamic trade-off basis through the application of the third assessment, wherein the selectively converting step selectively converts the data in the source representation to the data in the destination representation based on an idiosyncratic destination profile of a destination apparatus represented by the destination representation automatically and without receiving a specification of a conversion form of the data in the destination representation from a user, and wherein the quantitative physical storage constraints, the quantitative physical converting constraints, and the quantitative physical transfer constraints are made comparable through assigning to the respective constraints appropriate absolute values of a cost metric.

* * * * *